United States Patent
Bary et al.

(10) Patent No.: US 6,459,654 B1
(45) Date of Patent: Oct. 1, 2002

(54) TRANSMISSION METHOD AND SYSTEM USING A STANDARD TRANSMISSION NETWORK FOR CONNECTING ELEMENTS OF A SEISMIC DEVICE

(75) Inventors: Rénate Bary, Rueil Malmaison; Michel Guion, Puteaux, both of (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 179 days.

(21) Appl. No.: 09/667,578

(22) Filed: Sep. 22, 2000

(30) Foreign Application Priority Data

Sep. 27, 1999 (FR) ............................................. 99 12113

(51) Int. Cl.$^7$ ................................................ G01V 1/22
(52) U.S. Cl. ..................................... 367/77; 340/825.15
(58) Field of Search .............................. 367/76, 77, 78; 340/825.15

(56) References Cited

U.S. PATENT DOCUMENTS

| | | | | |
|---|---|---|---|---|
| 4,583,206 A | * | 4/1986 | Rialan et al. | 367/77 |
| 4,628,494 A | * | 12/1986 | Rialan et al. | 367/77 |
| 5,550,787 A | * | 8/1996 | Rialan et al. | 367/77 |
| 5,563,847 A | * | 10/1996 | Grouffal et al. | 367/65 |
| 5,706,250 A | * | 1/1998 | Rialan et al. | 367/77 |
| 5,822,273 A | * | 10/1998 | Bary et al. | 367/77 |

FOREIGN PATENT DOCUMENTS

| | | | | |
|---|---|---|---|---|
| FR | 2538194 | 6/1984 | ............ | G01V/1/22 |
| FR | 2720518 | 12/1995 | ............ | H04B/7/005 |
| FR | 2770732 | 5/1999 | ............ | H04Q/9/00 |

* cited by examiner

Primary Examiner—Gregory J. Toatley, Jr.
(74) Attorney, Agent, or Firm—Antonelli, Terry, Stout & Kraus, LLP (57) ABSTRACT

Transmission method for connecting together a central control and seismic recording station (SCC), local intermediate control and concentration stations (RRS) and local seismic data acquisition, processing and transmission units (RTU). It comprises using a transmission network (L, RFi) working according to a particular transmission protocol in order to interconnect the central station and the intermediate stations for example, previous measurement of the data transit time on the transmission channels between the central station and acquisition units (RTU), pretriggering of seismic data acquisition by acquisition units (RTU), the holding time interval in relation to the time of reception of reference signal (TB) being fixed and greater than the transit time, and applying to reference signal (TB), in the intermediate station, an adjusted compensation delay to take account of the effective transfer time fluctuations linked with its passage through multitask control means of the intermediate stations and transmission network (L, RFi) in order to respect the holding time interval. All the acquisition units can thus be perfectly synchronized. The system can be applied for transmission of a TB concomitant with the triggering of a seismic source for example.

20 Claims, 7 Drawing Sheets

TRANSMISSION METHOD AND SYSTEM USING A STANDARD TRANSMISSION NETWORK FOR CONNECTING ELEMENTS OF A SEISMIC DEVICE

FIELD OF THE INVENTION

The present invention relates to a transmission method and system using a standard transmission network for connecting together elements of a seismic device, allowing to transmit with precision a signal indicative of a reference instant.

The transmission system according to the invention can find applications in many fields where remote stations are to be synchronized without necessarily using dedicated communication means.

BACKGROUND OF THE INVENTION

This is the case in the field of seismic prospecting where signals received by seismic receivers arranged at the surface for example and reflected by the subsoil discontinuities in response to the emission of seismic waves by a vibratory or impulsive source are recorded. Seismic data collection sets comprising a great number of acquisition units arranged on the site to be explored and suited to collect (amplify, filter, digitize and store) the signals are used. The data stored are transmitted to a central control and recording station from each acquisition unit at fixed intervals (for example after each emission-reception cycle, after each daily session, etc.) or <<with the stream >>, as soon as a transmission time interval is available, either directly or by means of intermediate stations or concentrators. Seismic acquisition systems are for example described in patents FR-2,511,772 (U.S. Pat. No. 4,583,206) or FR-2,538,194 (U.S. Pat. No. 4,628,494), FR-2,692,384 (U.S. Pat. No. 5,550,787), FR-2,696,839 (U.S. Pat. No. 5,706,250), FR-2,710,757 (U.S. Pat. No. 5,563,847), FR-2,720,518 (U.S. Pat. No. 5,822,273), FR-2,766,580.

It is important that all the acquisition units distributed over the explored site can be synchronized with a common reference instant, generally the time of triggering of the seismic source, whatever the distance in relation to the central station that transmits the indicative signal thereto and whatever the transmission channel used therefore, failing which the combinations of centralized data become very imprecise.

There are well-known methods and devices allowing perfect time resynchronization of remote stations with a central station communicating by means of communication channels when it has been possible to measure the time of propagation of the signals on these channels.

Patent FR-2,538,194 (U.S. Pat. No. 4,628,494) filed by the applicant describes for example a method for synchronizing the acquisition of seismic signals by an acquisition unit in the field, with a reference instant such as the time of triggering of a seismic source when the time of propagation Δt thereto of the signal indicative of this instant is known, by a transmission channel such as a cable or a radio channel. The method essentially consists in sending a presignal starting the acquisition of signals coming from the seismic receivers and the storage thereof in a local memory. When the reference signal emitted thereafter is received at the acquisition unit at a time t, all the samples stored from the time (t−Δt), i.e. the reference instant, are sought in the local memory.

Patent application FR-98/15,792 describes a method and a device also allowing to produce, for each seismic signal, a series of samples of these signals re-staggered from a reference instant, from a first series of digitized samples of this seismic signal produced from any initial instant prior to the reference instant, knowing the effective time interval between these two instants. The method comprises determining coefficients of a digital filter that will compensate for the fractional part of the measured effective time interval, and applying this digital compensation filter to the first series of samples, allowing to obtain a series of digitized samples re-staggered from the reference instant.

However, these known location and readjustment techniques can only be applied if the time of propagation of reference signals through the emitting and receiving stations is precisely known, transfer management being performed by software means, notably within the scope of a multitask management, especially if one considers that the uncertainty relative to the effective propagation time in a seismic transmission system such as those mentioned above for example should not exceed about 100 μs.

Transmission without more or less random time lag is possible and easier to implement when one owns the network used and controls the form of the signals emitted and the coding mode. When signal TB representative of the effective time of emission by the source reaches the central station, it is possible, by means of suitable circuits, to inject this signal directly onto the communication channel that connects it to the receiving station and to prevent possible non-constant delays due to the station management system.

Standard communication networks are advantageous. They allow high-rate transmission, they are relatively easy to use and open-ended. They however work according to a particular communication protocol with specialized control circuits which one has to adapt to for precise transmission of the signals representative of reference instants.

THE METHOD AND THE SYSTEM ACCORDING TO THE INVENTION

The transmission method according to the invention allows to use a standard communication network for transferring synchronization data between a first control station and a second remote station while avoiding any uncertainty relative to the effective time of propagation of reference signals between communicating stations.

The transmission method according to the invention allows to connect together, by transmission channels, elements of a seismic device comprising local seismic data acquisition, processing and transmission units, a central control and recording station and at least one intermediate local control and concentration station, the elements of the device being provided with multitask control sets (such as programmed microcomputers), the method allowing precise synchronization of the local units with a reference signal emitted by the central station (a signal concomitant with the triggering of a seismic source for example).

The method comprises:
  using a transmission network (preferably a local network, of Ethernet™ type or others) working according to a particular transmission protocol, in order to interconnect the central station and at least one terminal station (the local intermediate stations or possibly the field acquisition units for configurations where the network extends to them),
  previous measurement of the time of transit (propagation time) of the data on the transmission channels between the central station and the acquisition units,
  pretriggering acquisition of seismic data by the acquisition units, the holding time interval in relation to the time of reception of the reference signal being fixed and greater than the transit time, and applying to the reference signal, in the terminal station, an adjusted compensation delay taking account of the effective transfer time fluctuations linked with its passage through multitask control means of the terminal station and the local network, in order to respect this holding time interval.

According to a first embodiment (purely hardware type solution), the method comprises:

direct detection, in the central station, of the reference signal, formation, from the reference signal detected, of a characteristic frame and direct application thereof to the interface module of the central station, detection, by an interface module of each terminal station, of the characteristic frame of the reference signal coming in through the transmission channel, and application to the reference signal in the terminal station of a compensation delay suited to said holding time interval.

According to a second embodiment (mixed hardware-software type solution), the method comprises:

direct detection of the reference signal and emission of a coded signal (a frame) to the terminal station by the local network, measurement of a time interval between the time the reference signal is taken into account by the multitask control means of the central station and its effective transmission on the local network in form of a coded signal, transmission of the value of this time interval in form of a second frame (coded signal), and application to the reference signal in the terminal station of an adjusted compensation delay according to this time interval in order to respect said holding time interval.

The method is particularly flexible because it allows, by means of an adjustable transmission delay compensation, to readily take account of the various data transfer rates of the transmission channels available in a complex transmission system such as those used for example in modem seismic prospecting devices.

The transmission system according to the invention allows to connect together, by transmission channels, elements of a seismic device comprising local seismic data acquisition, processing and transmission units, a central control and recording station and at least one local control and concentration station, the elements of the device being provided with multitask control sets. It allows precise synchronization of the local units with a reference signal emitted by the central station (signal concomitant with the triggering of a seismic source for example).

The system comprises:

a transmission network, preferably a local network (of Ethernet type or others) working according to a particular transmission protocol, for interconnecting the central station and at least one terminal station (the local intermediate stations or possibly the field acquisition units if the network extends thereto), comprising at least one transmission channel whose transmission lag is known, associated with interface modules in the central station and each terminal station, suited to respect said particular transmission protocol, means for measuring the time of transit (propagation time) of the data on each transmission channel to be used between the central station and the acquisition units, means for pretriggering acquisition of the seismic data by the acquisition units, with a holding time interval in relation to the instant of reception of the reference signal which is fixed and greater than the transit time, and means for applying to the reference signal an adjusted delay taking account of the effective transfer time fluctuations linked with its passage through said multitask control means (in the software <<layers>> of the programmed processors) and the local network, this delay being suited to the effective rate (measured when the device is installed in the field) of each transmission channel used.

This combination of a fixed holding time applied by all the acquisition units and of intermediate delay adjustment means suited to complete the known propagation times measured on the transmission channels, by means of a complementary delay taking account of the managing time fluctuations, allows all the acquisition units to be adjusted together to a common reference instant.

The time of transmission by the network being known with precision, it is also possible to combine such a network with conventional dedicated optical fiber, radio or cable transmission channels, while maintaining a perfect synchronism between these various channels.

BRIEF DESCRIPTION OF THE DRAWINGS

Other features and advantages of the method and of the system according to the invention will be clear from reading the description hereafter of a non limitative example, with reference to the accompanying drawings wherein.

DETAILED DESCRIPTION

The method and the system according to the invention are described hereafter within the particular scope of an application to a seismic prospecting device already described notably in patents FR-2,692,384 (U.S. Pat. No. 5,550,787), FR-2,696,839 (U.S. Pat. No. 5,706,250), FR-2,720,518 (U.S. Pat. No. 5,822,273) filed by the applicant.

I) Seismic Device

The seismic device comprises (FIG. 1) an often considerable set (several hundred to several thousand) of seismic receivers R producing each a <<seismic trace>> in response to the transmission in the ground of seismic waves produced by a source S coupled with the ground and reflected by subsoil discontinuities. Receivers R are subdivided into n groups GR1, GR2, . . . , GRn, comprising each a certain number q of receivers R. Local acquisition and transmission units RTU bearing references BA11, . . . BAp1, . . . BApk, . . . BApn similar for example to those described in patent FR-2,720,518 (U.S. Pat. No. 5,822,273) are arranged in the field, each one for digitizing and temporarily storing the seismic data collected by one or more receivers R of each group. Any group GRk of order k for example comprises a certain number q of receivers respectively connected to p local acquisition units RTU bearing references BA1k, BApk for example. Numbers p and q can be different if at least part of the local units RTU (BAp2 for example in FIG. 1) is intended for collection of the seismic data coming from more than one seismic receiver R. The seismic device can thus comprise for example several hundred local units RTU.

Figure 1:
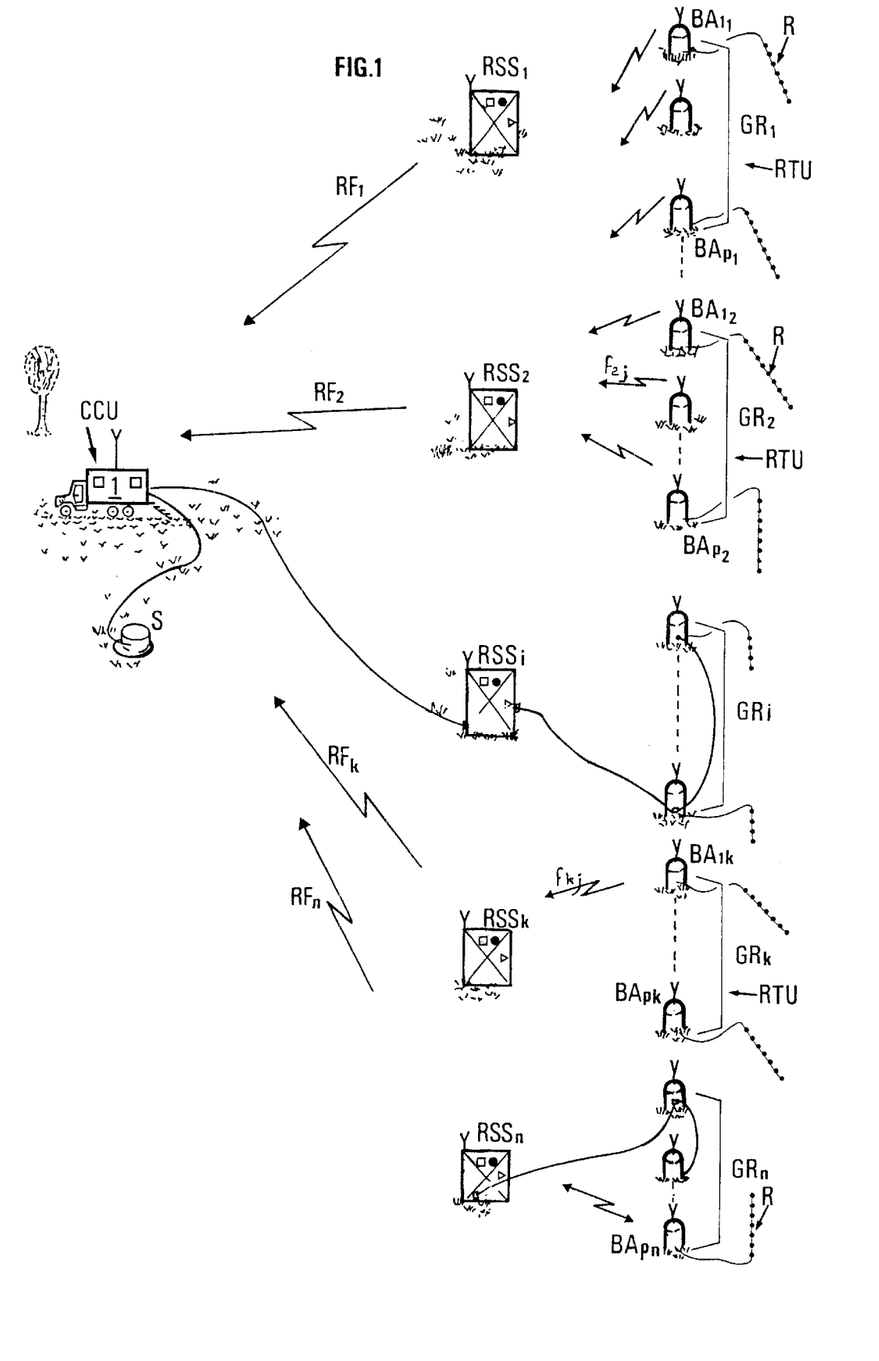
FIG. 1 diagrammatically shows a seismic device positioned in the field with various transmission channel possibilities between the elements, FIG. 2 diagrammatically shows a local concentration station RRS, FIG. 3 diagrammatically shows general central station CCU, FIG. 4 diagrammatically shows a concentration module DCU in a local station RRS.

The various groups of acquisition units RTU are respectively controlled by local control and concentration stations RRS bearing references RRS1, RRS2 . . . RRSi, . . . RRSk, . . . RRSn. These local stations are equipped to fulfil extensive functions:

control the acquisition units RTU of their respective groups, collect the seismic data (seismic traces) of the various units RTU, store them in a mass memory (one or more disks for example), transfer on request, to central station CCU, at least part of the data stored: either parameters indicative of the proper running of the acquisition units or of the local stations (RRS), or at least part of each seismic trace, possibly compressed, in order to perform quality controls, manage testing and initialization operations on the linking means (Radio transmission channels or lines) and on the field equipments (seismic receivers, electronics in each acquisition unit RTU), monitor the proper progress of seismic operations, provide results and signal possible anomalies on request.

The various concentrators RRS, as well as source S, are controlled by a central control and recording station CCU where all the seismic data are eventually grouped together. Local stations RRS communicate with central station CCU by means of a local network LAN of a well-known type (Ethernet™ for example) comprising material links (optical fiber or cable L) or radio links $RF_1$, $RF_2$, . . . $RF_n$, this network working according to a specific transmission protocol.

II) Local Control and Concentration Stations (RRS)

Figure 4:
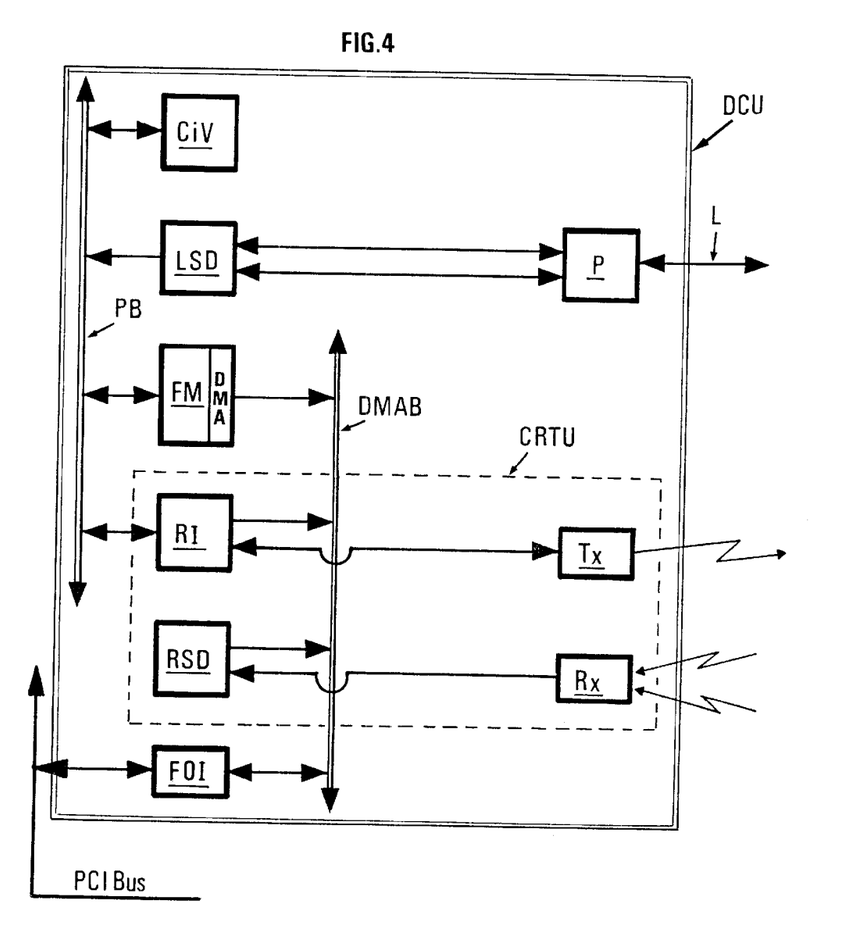

Each local station RRS comprises (FIG. 2) a central unit CPU with an extended RAM memory (32 Mo for example), communicating by means of an internal bus PCIBUS with a mass memory MM of several Go, and a concentration unit DCU (FIG. 4) for managing the communications of each local station RRS with local acquisition units RTU, either by means of Radio transmission channels $F_{kj}$ and/or by transmission lines or cables Ci.

Figure 2:
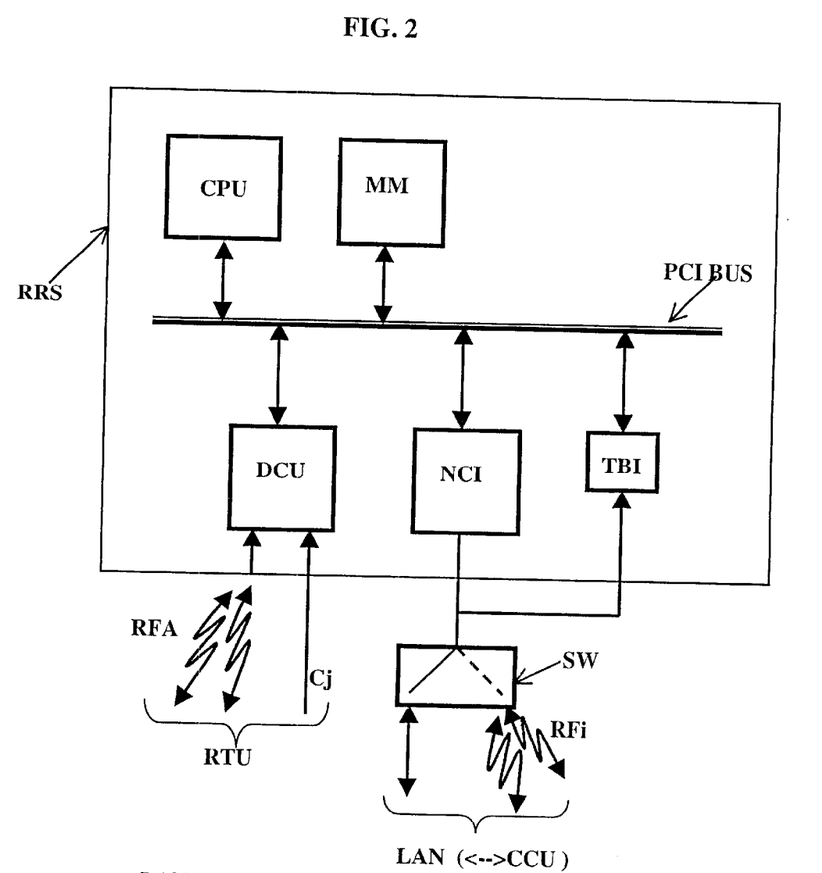
Figure 8:
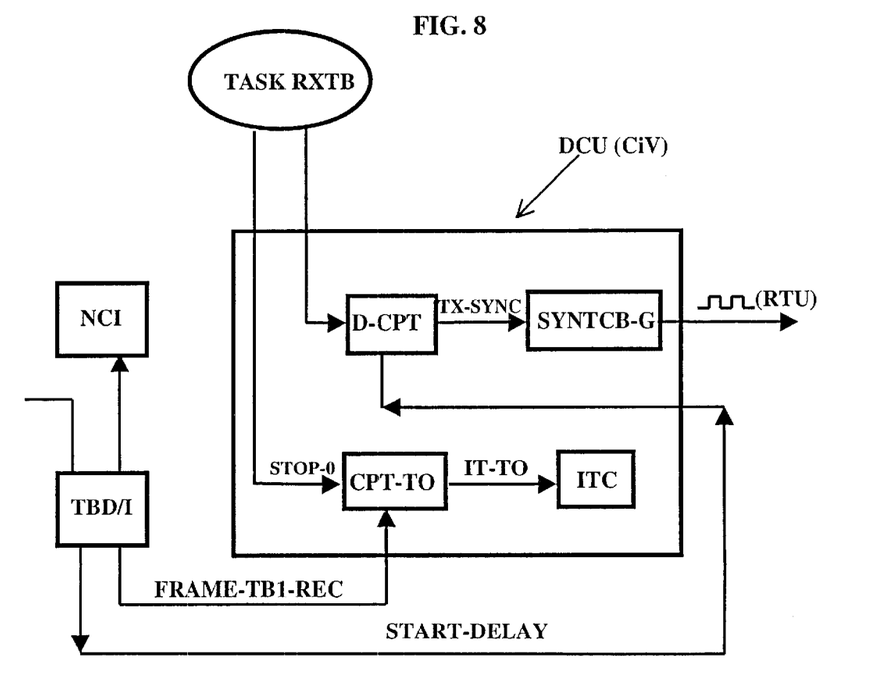
FIG. 8 is a block diagram similar to FIG. 6 illustrating the progress, in a local station RRS, of operations intended for reception and delay adjustment of reference signal TB, in the second embodiment (mixed solution), FIG. 9 diagrammatically shows an interface circuit TBI adjustable, as the case may be, to detection or to generation of a frame characterizing the reference signal.

An interface set NCI is also connected on bus PCIBUS. Network LAN comprising one or more lines L and/or radio transmission channels RFB, used for communication with central unit CCU, is connected to interface set NCI by means of a channel switch SW. An interface TBI intended for detection, on network LAN, of signals indicative of the initial time of triggering of seismic source S, is connected to interface set NCI on the one hand and to bus PCIBUS on the other hand. The functions of elements NCI and TBI will be described hereafter in connection with FIGS. 6 and 8.

III) Central Control Station CCU

Figure 3:
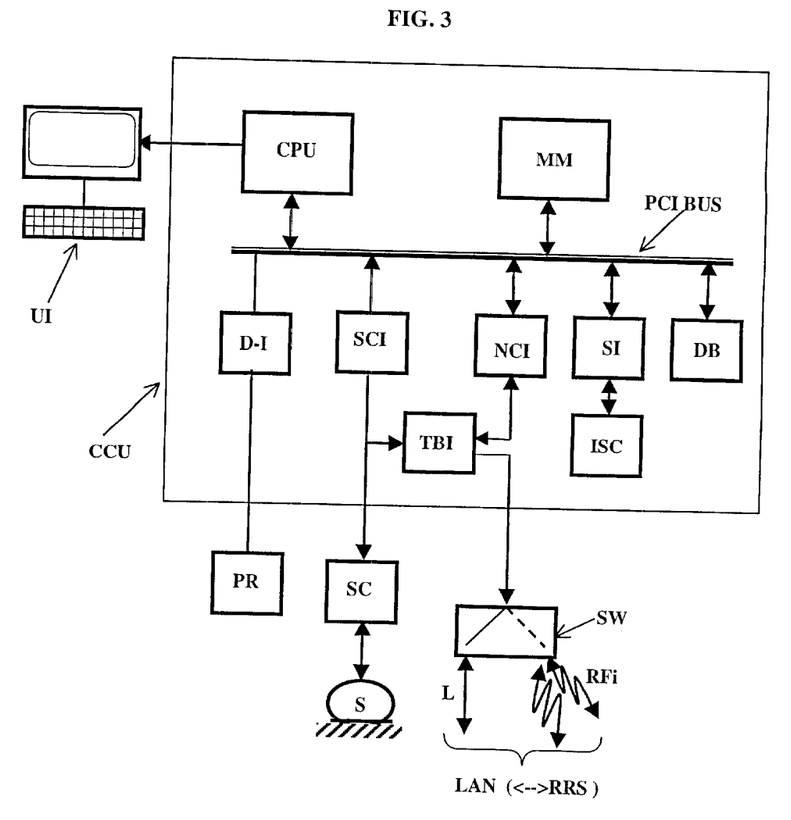

Central station CCU also comprises a central unit CPU provided with an extended RAM memory communicating, by means of an internal bus PCIBUS, with a high-capacity mass memory sufficient for recording the seismic traces transmitted by the acquisition units via control and concentration units RRS. It also comprises a local dialogue terminal UI for the operator's interventions, a printer PR allowing high-definition printing of seismic sections, maps, etc., which is connected to bus PCIBUS by an interface card DI. A high-capacity mass memory DB for storing a database consisting of seismic, geographic data, etc., is also connected to bus PCIBUS. An image scanner ISC used for entering in the database of memory DB possibly a geographic map of the zone where the seismic operations are carried out is also connected to this bus by means of an interface element SI. Such an image of the operation zone can be used to match the positioning points of the field pickups with precise geographic data.

Seismic source S is controlled by a control box SC forming, as soon as it is triggered, an indicative signal TB which is applied to central unit CCU by means of an interface card SCI.

An interface set NCI specifically suited to control network LAN is also connected on bus PCIBUS. Local network LAN (lines L and/or radio transmission channels RFi) used for connection with each local station RRS is connected to interface set NCI by means of a channel switch SW. An interface circuit TBI is connected in parallel between interface elements NCI and SCI. The functions of elements NCI and TBI will also be described hereafter in connection with FIGS. 6 and 8.

Concentration module DCU of each local station RRS (FIG. 4) is intended to relay the transmission of instructions from control unit CPU to local stations RRS and conversely, the reception of seismic data. It comprises two electronic cards. A first card includes a set CiV whose functions will be described in connection with FIGS. 6, 8, a line synchronous detection circuit LSD communicating by means of input/output ports P with one or more transmission lines Ci for communication with acquisition units RTU in the field (FIG. 1). A second card includes memory modules FM with DMA, accessible by means of an internal bus DMAB. Interface circuit FOI allows exchanges between exchange bus DMAB and central unit CPU (FIG. 2) by means of bus PCIBUS. The first three cards CPU, LSD, FM communicate by means of an internal bus PB.

Each concentration unit DCU comprises a radio emission-reception unit CRTU similar to the unit described in the aforementioned patent FR-2,720,518 (U.S. Pat. No. 5,822,273), which is suited, when this linking mode is established, to establish communications by Radio transmission channels with local units RTU. This unit CRTU comprises (FIG. 4) an interface circuit RI connected to exchange bus DMAB, to internal bus PB and to a radio transmitter Tx emitting for example in TFM mode (Tamed Frequency Modulation) well-known to specialists, and a synchronous Radio transmission modulation detection circuit RSD connected to a radio receiver Rx.

IV) Programming Activities According to Tasks

As described in the aforementioned patent FR-2,720,518 (U.S. Pat. No. 5,822,273), the various activities allowing proper progress of the processes are divided into listed tasks, each dedicated to a specific process, in form of programs integrated in the computers in central station CCU 1, in local stations RRS and in local units RTU.

The tasks can be performed in sequence or concurrently by switching. A real-time allocation program manages the start or the interruption of tasks by taking account of the respective priority degrees thereof, or their restart when they have been interrupted a) through lack of all the required data at a time of their execution, or b) upon reception of an interruption message coming from another task, or c) as a result of an external event.

The function of a task, all the data required for the execution thereof, the drivers required, all the interruptions imposed by the task and its predetermined priority degree are taken into account in order to define a task.

The tasks can access a database consisting of parameters entered by the operator, of the acquired seismic data and of the seismic system control parameters.

Figure 10:
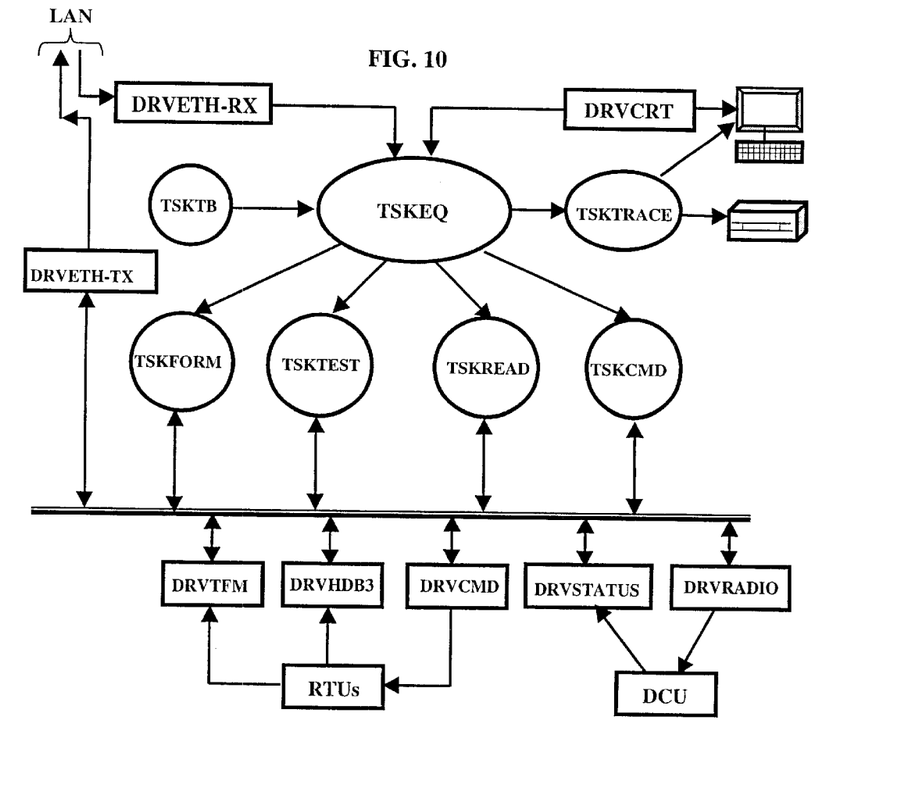
FIG. 10 is a general block diagram illustrating the software-implemented management of the functions fulfilled by a local station.

The interdependence relations of the various tasks performed by each local control and concentration station RRS for example are shown in the diagram of FIG. 10.

V) Transmission of Reference Signal TB by Local Network LAN

Repetitive transmission without delay of signal TB indicative of the precise time of triggering of source S (time of <<firing >>) to local concentration stations RRS and then to acquisition units RTU is achieved according to the following procedures:

No traffic occurs on network LAN during shooting triggering, the effective time of transfer of the signals on each transmission channel of network LAN from the emission from the CCU to the input in the RRS is not the same according to whether a cable, an optical fiber or a Radio transmission link is used but, for each one of these channels, it is constant and reproducible. It is measured with precision upon connection of each RRS to network LAN, emission of signal TB from local stations RRS towards acquisition units RTU is delayed by a known fixed delay. This delay, which takes account of all the transit times in the transmission system, is known by acquisition units RTU;

when signal TB is received by acquisition boxes RTU, acquisition of the seismic signal has already started with a starting presignal (Pre-TB). As described in patent FR-2,666,946 (U.S. Pat. No. 5,245,647), the seismic samples acquired are stored in a buffer memory of acquisition units RTU whose size is sufficient to contain all the samples acquired during a time interval between the presignal and the first sample to be held, acquired after the initial reference instant;

this time interval is conventionally selected greater than the maximum time of propagation of the signals on the physical transmission channels that can be used (variable according to whether optical fibers, cables or Radio transmission channels are used) while remaining compatible with the size of the buffer memories. Since the real time of transmission of the reference signal is likely to fluctuate when multitask microcomputers are used, which is common practice, the method comprises, if need be, applying intermediate adjustable delays (by means of delay counters) intended to complete the known intangible delays (propagation times measured once and for all as the seismic device is installed in the field) so that all the acquisition units RTU are synchronous with the reference instant after this time interval.

Transmission by network LAN can be achieved either 1) by using added specific electronic modules, or 2) by mixed use of hardware and softwares.

V-1 Added Modules

1a) In Central Station CCU

Figure 5:
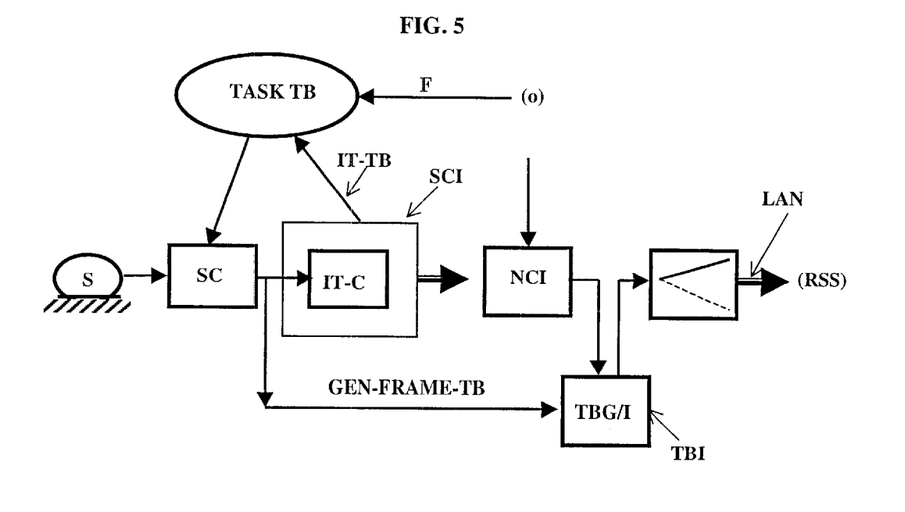
FIG. 5 is a block diagram illustrating the progress, in central station CCU, of reference signal TB emission operations, in a first embodiment (purely hardware type solution)
Figure 9:
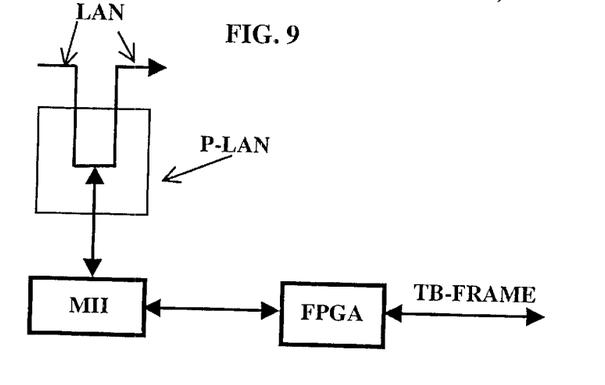

The firing sequence operations in the station progress as follows:

Operator O triggers the seismic shooting (FIG. 5) and the corresponding signal F is sent to a task TB of central station CCU, a pretriggering signal is transmitted by network LAN to local stations RRS which transmit it to acquisition units RTU. Upon reception of this signal, the acquisition units start acquiring the signals coming from the receivers in the field and store them in a buffer memory, task TB emits a signal that is transferred to source S by its control box SC, thus activating the triggering thereof, this triggering instant is signalled to central station CCU by a signal TB, signal TB is sent to an interruption controller IT-C in interface module SCI, which leads to an interruption of the task in progress and an interruption signal IT-TB is almost immediately taken into account. Control box SC produces a signal GEN-FRAME-TB. Interface circuit TBI comprises a set TBG/I connected to network LAN between network control interface NCI and switch SW, and it is suited to generate a frame TB (FIG. 9), task TB takes account of signal IT-TB to control the proper progress of the operations.

1b) In Local Stations RRS

Interface TBD/I (of the type described in FIG. 9) is connected to network LAN between switch SW and network control interface NCI in order to detect the specific frame of the TB. Set DCU in each local station RRS comprises, in set CiV (FIG. 4), a delay counter D-CPT and a generator SYNCTB-G producing a frame signal synchronous with signal TB.

Task RXTB (FIG. 6) initializes counter D-CPT with the predetermined fixed delay corresponding to the propagation time on the linking channels used.

Figure 6:
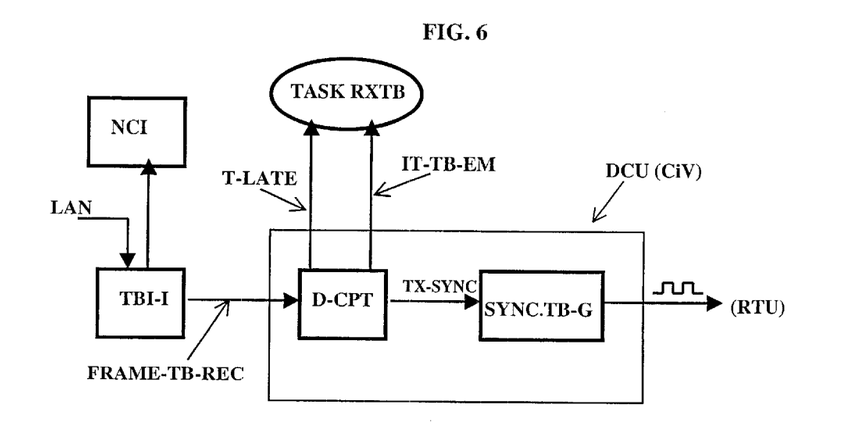
FIG. 6 is a block diagram illustrating the progress, in a local station RRS, of operations intended for reception and delay adjustment of reference signal TB, in the first embodiment.

Frame detection interface TB monitors the traffic on the physical link in order to detect frame TB, as soon as frame TB is detected, interface TBDI emits a signal FRAME-TB-REC which starts counter D-CPT, the end of counting of counter D-CPT causes the emission of a signal TX-SYNC to a circuit SYNCTB-G in the DCU which generates a signal SYNCTB which is then effectively transmitted to acquisition boxes. When counter D-CPT stops, a signal IT-TB-EM is sent to task RXTB to signal that processing of the TB has ended, the DCU also comprises a counter (not shown) allowing to delimit a time slot after which, if no signal TB is detected, the waiting procedure in progress is cancelled.

V-2 Mixed Hardware-Software Use

2a) In Central Station CCU

Interface SCI comprises an interruption controller IT and a delay counter D-TB1.

Figure 7:
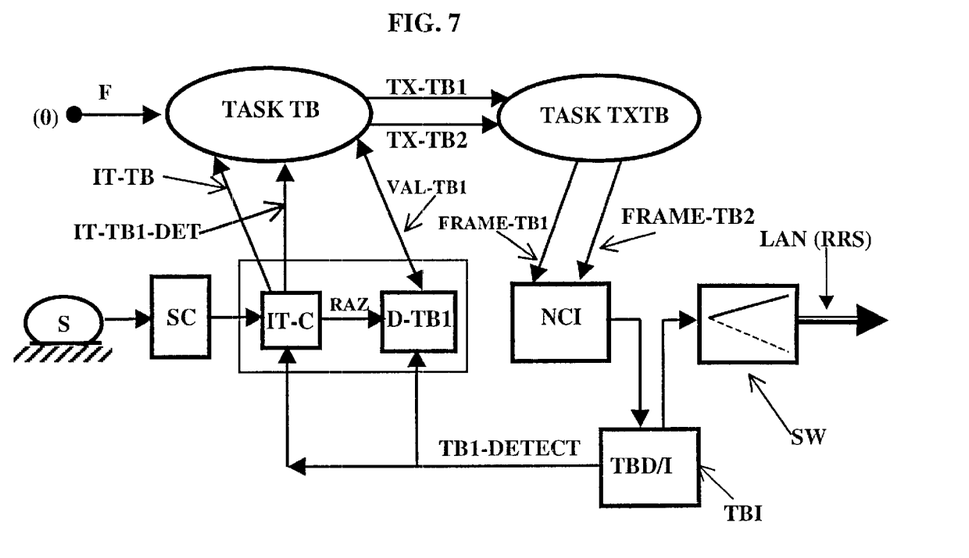
FIG. 7 is a block diagram similar to FIG. 5 illustrating the progress, in central station CCU, of reference signal TB emission operations, but suited to a mixed hardware-software type solution.

The firing sequence operations in the station progress as follows:

operator O triggers (FIG. 7), by means of a signal F, a task TB programmed in central station CCU, this task TB generates a control signal which is transmitted by its control interface SC (FIG. 3) to seismic source S, which causes the triggering thereof and is simultaneously signalled to central station CCU by a signal TB which constitutes the reference signal, signal TB is sent to interruption controller IT-C, which leads to an interruption of the task TB in progress and signal IT-TB is almost immediately taken into account. It simultaneously sends signal RAZ to delay counter D-TB1, which is reset and starts counting the time in microseconds, task TASK TB sends message TX-TB1 to another task TASK TXTB in order to request the emission of frame TB1 on network LAN to all the local stations RRS by means of network control interface NCI and switch SW, frame TB detection interface TBD/I monitors the traffic on the transmission circuit between network control interface NCI and switch SW in order to intercept frame TB1 as soon as it passes. It signals the effective emission of frame TB1 by sending signal TB1-DETECT to delay counter D-TB1, which stops it, and to interruption controller IT-C, which activates task TB by means of interruption signal IT-TB1-DET, task TB reads the value of delay counter D-TB1. This value represents the time of processing of signal TB between the time it is taken into account at the CCU input and its effective emission on the transmission channel to local stations RRS. Task TB transmits this value in message TX-TB2 to task TXTB, task TXTB generates frame TB2 containing the measured time and sends it to network control interface NCI in order to be transmitted to network LAN, then to the RRSs.

2b) In Local Stations RRS

Interface TBD/I intended for control of network NCI is interposed on network LAN (FIG. 8) to detect the specific frame of signal TB. Set CiV of the DCU (FIG. 4) in each local station RRS comprises a delay counter D-CPT, a generator SYNCTB-G producing a frame signal synchronous with signal TB, a counter CPT-TO and an interruption controller ITC.

The firing sequence operations in local stations RRS (FIG. 8) progress as follows:

as soon as the shooting sequence starts (FIG. 8), the frame TB detection interface monitors the traffic on the physical link in order to detect frame TB1, as soon as frame TB1 is detected, signal FRAME-TB1-REC starts counter CPT-TO which is previously initialized with a time slightly greater than the time between the transmission of frames TB1 and TB2. If frame TB2 is not received during this interval, a signal IT-T-O is generated and cancels the firing sequence. Simultaneously, signal START-DELAY starts counter D-CPT which has been previously initialized with the predetermined delay, upon reception of frame TB2, signal FRAME-TB2 starts task RXTB which emits signal STOP-T-O in order to stop counter CPT-TO. Counter D-CPT is corrected with the transit time value in the CCU extracted from frame TB2 according to the effective rate of the transmission channel used for this transfer, the end of counting of counter D-CPT leads to the emission of signal TX-SYNC towards the device generating signal SYNCTB-G which is then effectively transmitted to acquisition units RTU.

The interface intended for generation or detection of frame TBI (TBG/I or TBD/I) in central station CCU and each local station RRS comprises (FIG. 9) a suitable connection port P-LAN interposed on the network LAN used, allowing to either read the signals passing therethrough (TBD/I, FIG. 7) in order to detect passage of the reference signals, or to inject signals (FIG. 5, TBD/I) to be emitted on the network. This port communicates by means of a standard MII type interface circuit with circuits of a well-known type (FPGA) comprising a memory and programmable logical circuits. A signal frame (TB-FRAME) corresponding to the signal to be detected during passage through the network or to the signal to be injected onto this network is loaded into the memory.

The organization of the tasks in each local station RRS is diagrammatically shown in FIG. 10. The various abbreviations used to designate the elements and the tasks respectively mean:

DRVETH: local network driver;
DRVCRT: console driver;
TSKTB: TB task;
TSKSEQ: sequencing task;
TSKTRACE: seismic trace storage task in a mass memory;
TSKFORM: field equipment installation control task;
TSKTEST: test task;
TSKREAD: data reading task;
TSKCMD: command emission task;
DRVTFM: radio reception driver;
DRVHDB3: reception on line driver;
DRVCMD: command emission driver;
DRSSTATUS: status driver, and
DRVRADIO: radio link driver.

Embodiments where the standard network LAN is used for connecting the central station to the intermediate stations have been described. The same technique would be used if the terminal stations on network LAN were acquisition units RTU without departing from the scope of the invention.

It is also clear that the technique for measuring the time interval required for taking account of reference signal TB and the adjustable transmission delay compensation can also be applied if a network referred to as owner network is used instead of a LAN type standard network.

We claim:

1. A transmission method for connecting together, by means of transmission channels, elements of a seismic device comprising local seismic data acquisition, processing and transmission units (RTU), a central control and recording station (CCU) and at least one local control and concentration station (RRS), the elements of the device being provided with multitask control sets, the method allowing precise synchronization of local units (RTU) with a reference signal (TB) emitted by central station (CCU), characterized in that it comprises:

using a transmission network (L, RFi) for interconnecting the central station and at least one terminal station, previous measurement of the data transit time on the transmission channels between central station (CCU) and acquisition units (RTU), pretriggering acquisition of the seismic data by acquisition units (RTU), the holding time interval in relation to the time of reception of reference signal (TB) being fixed and greater than the transit time, and applying to reference signal (TB) in the terminal station an adjusted compensation delay taking account of the effective transfer time fluctuations linked with its passage through the multitask control means of said terminal station and the transmission network in order to respect said holding time interval, this delay being adjusted according to the effective rate of each transmission channel of said network.

2. A method as claimed in claim 1, characterized in that it comprises direct detection, in central station (CCU), of reference signal (TB), formation, from the reference signal detected, of a characteristic frame and direct application thereof to an interface module (TCI) of central station (CCU), detection, in an interface module (TCI) of each terminal station, of a frame characteristic of reference signal (TB), and application to reference signal (TB), in the terminal station, of a compensation delay suited to said holding time interval.

3. A method as claimed in claim 1, characterized in that it comprises:

direct detection of reference signal (TB) and emission of a frame (TB1) to the terminal station by transmission network (L, RFi), measurement of a time interval between the time reference signal (TB) is taken into account by the multitask control means of central station (CCU) and its effective transmission on transmission network (L, RFi), transmission of the value of this time interval in form of a second coded signal (TB2), and application to reference signal (TB), in the terminal station, of an adjusted compensation delay taking account of this time interval in order to respect said holding time interval.

4. A method as claimed in claim 1, characterized in that said terminal station is a local station (RRS).

5. A method as claimed in claim 1, characterized in that said terminal station is a local unit (RTU).

6. A method as claimed in claim 1, characterized in that transmission network (L, RFi) is a standard local network (LAN) working according to a particular transmission protocol.

7. A transmission system for connecting together, by means of transmission channels, elements of a seismic device, comprising local seismic data acquisition, processing and transmission units (RTU), a central control and recording station (CCU) and at least one local control and concentration station (RRS), the elements of the device being provided with multitask control sets, the system allowing precise synchronization of local units (RTU) with a reference signal (TB) emitted by central station (CCU), characterized in that it comprises:

a transmission network (L, RFi) for interconnecting central station (CCU) and at least one terminal station (RTU, RRS) comprising at least one transmission channel whose transmission time is known, associated with interface modules (NCI) in the central station and each terminal station, suited to respect said particular transmission protocol, means for measuring the data transit time on each transmission channel between central station (CCU) and acquisition units (RTU), means for pretriggering acquisition of seismic data by acquisition units (RTU), with a holding time interval in relation to the time of reception of reference signal (TB) which is fixed and greater than the transit time, and means for applying to the reference signal an adjusted delay taking account of effective transfer time fluctuations linked with its passage through said multitask control means and transmission network (L, RFi), suited to the effective rate of each transmission channel used.

8. A system as claimed in claim 7, characterized in that it comprises an interface set (TBG/I) in central station (CCU) intended to directly generate on a transmission channel, towards each local station (RRS), a coded signal representative of the reference signal, an interface set (TBD/I) for decoding said coded signal, counting means (D-CPT) for applying a determined delay to the decoded signal, this delay depending on the effective rate of the transmission channel used for transfer of the reference signal, and a generator (SYNCTB-G) for generating a signal (SYNCTB) synchronous with the retarded signal towards acquisition units (RTU).

9. A system as claimed in claim 8, characterized in that said terminal station is a local station (RRS).

10. A system as claimed in claim 8, characterized in that said terminal station is a local unit (RTU).

11. A system as claimed in claim 8, characterized in that transmission network (L, Rfi) is a standard local network (LAN) working according to a particular transmission protocol.

12. A system as claimed in claim 7, characterized in that it comprises, in central station (CCU), an interruption controller (IT-C), software means for controlling the emission of a first frame (TB1) characteristic of the reference signal, in order to measure a time interval between detection of the reference signal and the effective emission of said frame on a transmission channel of transmission network (L, RFi) and to transmit a second frame (TB2) indicative of the duration of this time interval, and, in each local station (RRS), an interface set (TBD/I) for decoding said frames (TB1, TB2), counting means (D-CPT) for application of a delay to the decoded signal, a generator (SYNCTB-G) for generating a signal (SYNCTB) synchronous with the retarded signal towards acquisition units (RTU) and software means intended to control the application, by means of counting means (D-CPT), of a delay depending on the time interval measured and on the effective rate of the transmission channel used for transfer of the reference signal.

13. A system as claimed in claim 12, characterized in that said terminal station is a local station (RRS).

14. A system as claimed in claim 12, characterized in that said terminal station is a local unit (RTU).

15. A system as claimed in claim 12, characterized in that transmission network (L, Rfi) is a standard local network (LAN) working according to a particular transmission protocol.

16. A system as claimed in claim 7, characterized in that said terminal station is a local station (RRS).

17. A system as claimed in claim 16, characterized in that transmission network (L, Rfi) is a standard local network (LAN) working according to a particular transmission protocol.

18. A system as claimed in claim 7, characterized in that said terminal station is a local station (RTU).

19. A system as claimed in claim 18, characterized in that transmission network (L, Rfi) is a standard local network (LAN) working according to a particular transmission protocol.

20. A system as claimed in claim 7, characterized in that said transmission network (L, RFi) is a standard local network (LAN) working according to a particular transmission protocol.

* * * * *